(12) United States Patent
Garnavi et al.

(10) Patent No.: US 9,792,694 B2
(45) Date of Patent: **\*Oct. 17, 2017**

(54) SEGMENTATION USING HYBRID DISCRIMINATIVE GENERATIVE LABEL FUSION OF MULTIPLE ATLASES

(71) Applicant: International Business Machines Corporation, Armonk, NY (US)

(72) Inventors: Rahil Garnavi, Carlton (AU); Xi Liang, Carlton (AU); Suman Sedai, Carlton (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/276,744

(22) Filed: Sep. 26, 2016

(65) Prior Publication Data

US 2017/0018089 A1 Jan. 19, 2017

Related U.S. Application Data

(63) Continuation of application No. 14/610,900, filed on Jan. 30, 2015, now Pat. No. 9,483,831.

(Continued)

(51) Int. Cl.
*G06K 9/34* (2006.01)
*G06T 7/00* (2017.01)
(Continued)

(52) U.S. Cl.
CPC .............. *G06T 7/0081* (2013.01); *G06T 7/11* (2017.01); *G06T 7/174* (2017.01); *G06T 2207/20128* (2013.01); *G06T 2207/30048* (2013.01)

(58) Field of Classification Search
USPC .......... 382/180, 173, 128, 131, 103; 700/98; 707/E17.024
See application file for complete search history.

(56) References Cited

U.S. PATENT DOCUMENTS 8,160,345 B2   4/2012   Pavlovskaia et al.
8,265,356 B2   9/2012   Han et al.
(Continued)

OTHER PUBLICATIONS

N. Otsu, "A threshold selection method from gray-level histograms," IEEE Trans. Sys., Man., Cyber., vol. 9, pp. 62-66, Jan. 1979.

(Continued)

*Primary Examiner* — Anh H Do
(74) *Attorney, Agent, or Firm* — Louis J. Percello; Otterstedt, Ellenbogen & Kammer, LLP

(57) ABSTRACT

A method for segmenting a target image includes receiving the target image of an anatomical structure, registering a plurality of atlases to the target image, each of the atlases including an image and a plurality of labels corresponding to portions of the image, selecting a plurality of registered atlases, transferring the labels of selected registered atlases to the target image, combining the labels that are transferred to the target image using a fusion of a discriminative model and a generative model, and outputting a segmentation of the target image isolating the anatomical structure, wherein a segmentation of the target image is displayed.

10 Claims, 4 Drawing Sheets

Related U.S. Application Data

(60) Provisional application No. 61/946,120, filed on Feb. 28, 2014, provisional application No. 62/077,230, filed on Nov. 8, 2014.

(51) Int. Cl.
*G06T 7/11* (2017.01)
*G06T 7/174* (2017.01)

(56) References Cited

U.S. PATENT DOCUMENTS

| | | |
|---|---|---|
| 8,855,387 B2 | 10/2014 | Hamadeh et al. |
| 9,208,572 B2 | 12/2015 | Liu et al. |
| 9,251,596 B2 * | 2/2016 | Rueckert ............... G06K 9/468 |
| 9,483,831 B2 * | 11/2016 | Garnavi ............... G06T 7/0081 |
| 2004/0059754 A1 | 3/2004 | Barghout |
| 2014/0056501 A1 | 2/2014 | Du |
| 2014/0247977 A1 | 9/2014 | Han |
| 2015/0248768 A1 | 9/2015 | Garnavi |

OTHER PUBLICATIONS

Mobahi, "Segmentation of natural images by texture and boundary compression," International Journal of Computer Vision, vol. 95, pp. 86-98, Oct. 2011.

Samet, "Storing a collection of polygons using quadtrees," ACM Transactions on Graphics, pp. 182-222, Jul. 1985.

Heckemann, "Automatic anatomical brain mri segmentation combining label propagation and decision fusion," Neuroimage, vol. 33(1), pp. 115-126, Oct. 2006.

Warfield, K H. Zou, and W. M. Wells, "Simultaneous truth and performance level estimation (staple): an algorithm for the validation of image segmentation," IEEE Trans Med Imaging, vol. 23(7), pp. 903-921, Jul. 2004.

Sabuncu, "A generative model for image segmentation based on label fusion," IEEE Trans Med Imaging, vol. 29(10), pp. 1714-1729, Oct. 2010.

* cited by examiner

SEGMENTATION USING HYBRID DISCRIMINATIVE GENERATIVE LABEL FUSION OF MULTIPLE ATLASES

CROSS-REFERENCE TO RELATED APPLICATIONS

This application is a continuation of U.S. patent application Ser. No. 14/610,900 filed Jan. 30, 2015 and entitled Segmentation Using Hybrid Discriminative Generative Label Fusion of Multiple Atlases, which in turn claims the benefit of U.S. Provisional Patent Application No. 61/946,120, filed on Feb. 28, 2014, and U.S. Provisional Patent Application No. 62/077,230, filed on Nov. 8, 2014. The complete disclosures of U.S. patent application Ser. No. 14/610,900, U.S. Provisional Patent Application No. 61/946,120, and U.S. Provisional Patent Application No. 62/077,230 are herein expressly incorporated by reference in their entireties for all purposes.

BACKGROUND

The present disclosure relates to methods for image segmentation, and more particularly to a method for multi-atlas based segmentation.

Image segmentation is a process of partitioning an image into one or more groups of pixels sharing certain characteristics. A group or groups of pixels can delineate an object of interest. Image segmentation simplifies the representation of an image and can be performed in two dimensions (2D) or three dimensions 3D.

In the context of medical imaging, accurate delineation of anatomical structures is critical for reliable quantitative analysis. For example, segmentation of left and right ventricles in cardiac images is a prerequisite for assessment of cardiac function (e.g., volume measurements, estimation of ejection fraction and myocardial motion analysis) as well as diagnosis of various cardiac diseases. In clinical routines, the segmentation task is often performed manually, which is tedious and time-consuming, in particular when dealing with very large number of scans, e.g., screening practice. Manual segmentation is also difficult to reproduce and suffers from inter and intra-observer variabilities.

BRIEF SUMMARY

According to an exemplary embodiment of the present invention, a method for segmenting a target image includes receiving the target image of an anatomical structure, registering a plurality of atlases to the target image, each of the atlases including an image and a plurality of labels corresponding to portions of the image, selecting a plurality of registered atlases, transferring the labels of selected registered atlases to the target image, combining the labels that are transferred to the target image using a fusion of a discriminative model and a generative model, and outputting a segmentation of the target image isolating the anatomical structure.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

According to an exemplary embodiment of the present invention, a plurality of labeled atlases are registered to a target image. The labels of the atlases are transferred to each pixel the target image, such that each pixel can be associated with labels from different atlases. The transferred labels of each pixel of the target image are fused using a discriminative model and a generative model to determine a synergistic label for each pixel and resulting in segmentation of the target image.

Embodiments of the present invention are applicable to fields including medical imaging for segmenting one or more objects of interest in a target image of anatomy. The object(s) of interest can include the left and right ventricles of a heart, fibroglandular tissue or adipose tissue or fat in breast tissue, the hippocampus in a brain, etc. Other exemplary fields include quantitative analysis of anatomical functions, such as cardiac function, brain function, etc., and the diagnosis of disease.

For example to segment heart anatomies (e.g., left ventricle and right ventricle), the heart atlases where heart anatomies are labeled are used. Similarly, to segment brain parts (e.g., hippocampus, cerebral lobe), the brain atlases where the brain parts are labeled are used.

Figure 1:
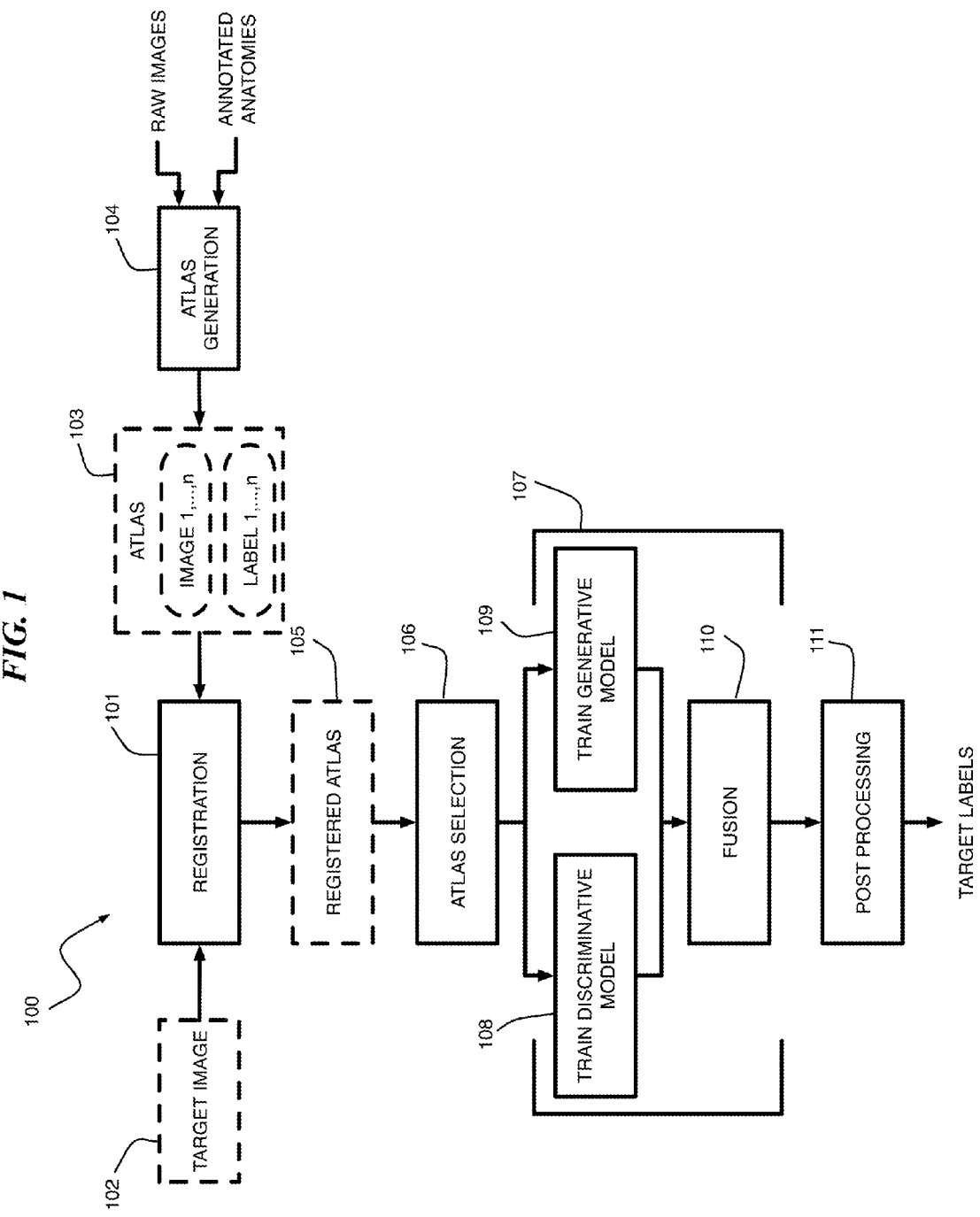
FIG. 1 is a flow diagram of a multi-atlas segmentation method according to an exemplary embodiment of the present invention.

Referring to FIG. 1, according to an exemplary embodiment of the present invention, a multi-atlas segmentation can be performed in a 2D image (e.g., 2D brain scan) or a 3D volume (e.g., cardiac magnetic resonance imaging (MM)). Hereinafter, "target image" will be used as a general term meaning either 2D image or 3D volume, unless expressly noted otherwise. The multi-atlas segmentation combines a discriminative method and a generative learning method to label pixels of the target image. As shown in FIG. 1, a segmentation method 100 includes atlas generation 104, registration 101, atlas selection 106, a label fusion framework 107, and post processing 111.

During atlas generation 104, one or more anatomical structures of interest are labeled in a set of images or volumes. The labeling of the anatomical structures of interest can be performed manually by domain experts, e.g., clinicians or radiologist. More particularly, the images are labeled by label l to identify anatomical structures such as left ventricle, a right ventricle a right atrium and a left atrium in a cardiac image. In one or more embodiments of the present invention, the labels are represented in an image format where pixels of an anatomical structure share the same value, e.g., "LV" for pixels corresponding to the left ventricle. An image and its corresponding labels comprise an atlas.

It should be understood that embodiments of the present invention are not limited to manual labeling, and other methods can also be used (e.g., semi-automated labeling).

During registration 101, each atlas 103 is registered against a given target image 102. The registration 101 can be performed using one or more registration techniques, such as a rigid registration, an affine registration, and a deformable registration. The registration 101 gives a correspondence between the target image 102 and each of the atlases 103. In one or more embodiments of the present invention, the correspondence is determined pixel-to-pixel. According to one exemplary embodiment of the present invention, in a case where a target image and an atlas image have different resolution, the pixels in atlas image are resampled to match the resolution of the target image. The correspondence is used to generate a plurality of registered atlases 105 for the target image 102 and to transfer the labels from each atlas to the target image.

According to an exemplary embodiment of the present invention, one or more registered atlases are selected at 106. More particularly, k atlases are selected for the target image from the registered atlases 105 using one or more features of the images (e.g., intensity, texture, etc.), where k is a positive integer. These features can be different criteria and/or attributes. For example, the correlation of pixel intensity between the target image and the atlas images around the anatomical structure of interest can be one criteria.

To perform the selection 106, a feature similarity between each registered atlas and the target image is determined and a rank R1 for each atlas is obtained, where a low rank is given to an atlas similar to the target image and a high rank to a dissimilar atlas. Further, a feature distance (such as Normalized Correlation Coefficient, Sum of Squared distance, etc., between the pixels in the atlas image and the target image can be used) between each of the registered atlases and the target image is determined. Each atlas is assigned a rank value R2, where a low rank is assigned to a similar atlas and a high rank is assigned to a dissimilar atlas. According to an embodiment of the present invention, a combined score for an atlases image is defined as the R1+R2. The k atlases with the smallest final scores can be selected.

One of ordinary skill in the art would appreciate that different rankings and selection criteria can be used without departing from the scope of the present disclosure.

In an atlas label fusion framework 107, the labels of each of the atlases obtained from the atlas selection 106 are combined to obtain fused labels for the target image. According to an embodiment of the present invention, a label fusion framework 107 uses a hybrid of a discriminative method and a generative method. The label fusion framework 107 includes discriminative training 108, generative model learning 109, and a fusion of the discriminative and generative models 110.

A discriminative model, which is a probabilistic classifier, is trained 108 in a local window using atlas patches as training samples. The discriminative model acts as a prior model p(l) and gives an initial hypotheses of the label l in terms of a first score. The label l is indexed to the objects (e.g., l=1 refers to Right ventricle and l=2 refers to Left ventricle in a heart) to be segmented in the target image.

A probability distribution function is trained for each label (e.g., left ventricle, right ventricle, etc.) as a generative model 109. For example, in the context of a cardiac image, the class labels can include "LV" for left ventricle, "RV" for right ventricle, "RA" for right atrium, "LA" for left atrium, etc. The generative model gives a likelihood value for the given feature (such as raw intensity values, histogram of oriented gradients or wavelets computed inside an image patch), in terms of a second score, that is, each label is associated with a likelihood value.

According to an exemplary embodiment of the present invention, the first score from the probabilistic classifier, used as a label prior, and the second score from the generative model are combined using a Bayesian rule at 110, wherein the hypothesis obtained from the probabilistic classifier is verified by the generative model p(f/l). The Bayesian rule is a patch-likelihood-based generative model outputting a fused score, which is a synergistic combination of the first score from the probabilistic classifier and the second score related to the feature likelihood.

The label fusion framework 107 combines the power of discriminative learning and generative modeling in a single framework to exploit complementary properties of the individual approaches. This hybrid approach to label fusion results in good segmentation performance and robustness by implicitly verifying the first scores from discriminative model 108 using the likelihood values or second scores from the generative model 109 in a Bayesian label fusion 110.

According to one or more embodiments of the present invention, all atlases include all of the objects to be segmented. Given a target image, each atlas image is registered to the target image. If there are N atlases, then after registration, N registered atlases are generated. Given registered atlases, the best K atlases are selected. The label fusion combines the labels from the selected registered atlases. In this context, if each atlas has 5 labeled objects, then the output of label fusion is the segmentation of the 5 objects.

Figure 2:
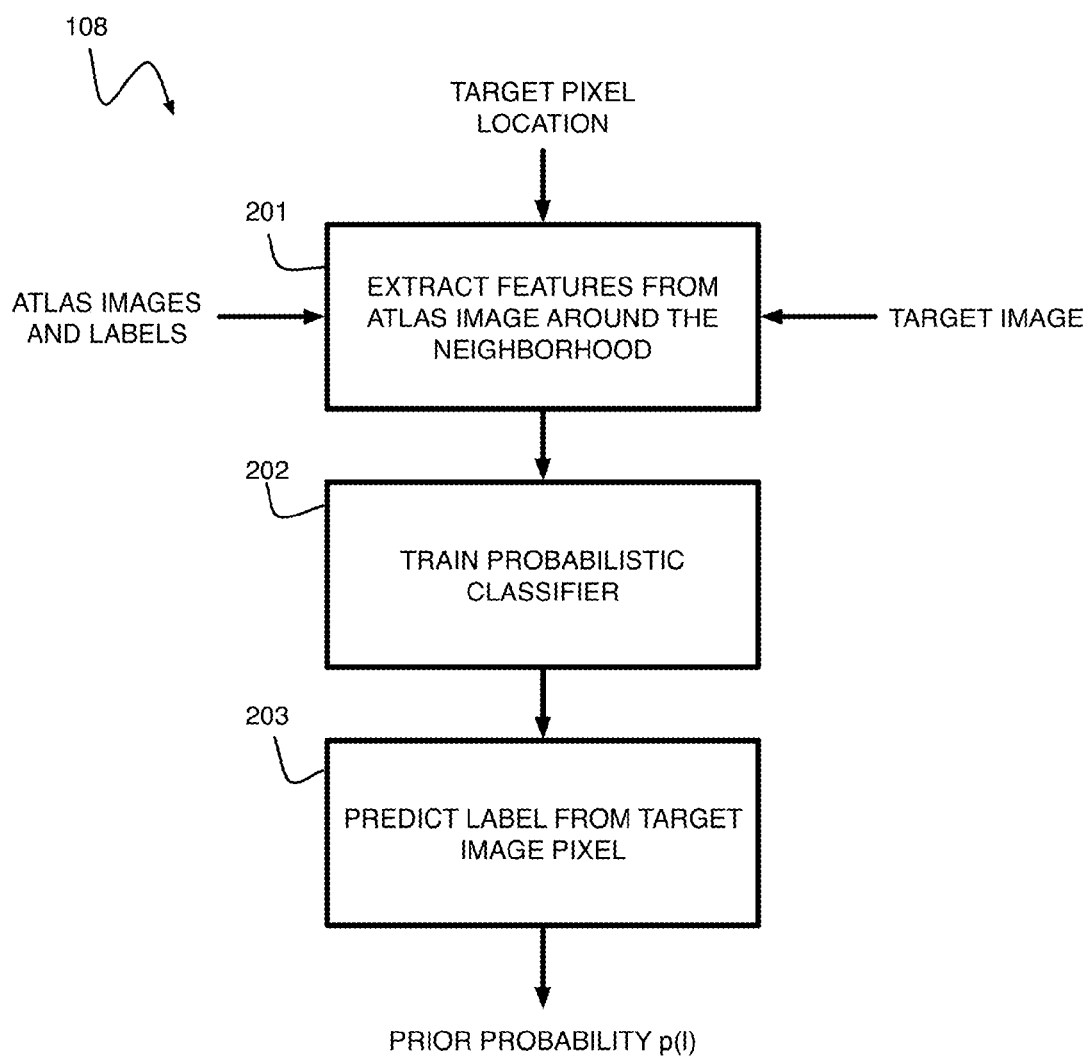
FIG. 2 is a flow diagram of a method for generative modeling in a label fusion method according to an exemplary embodiment of the present invention.
Figure 3:
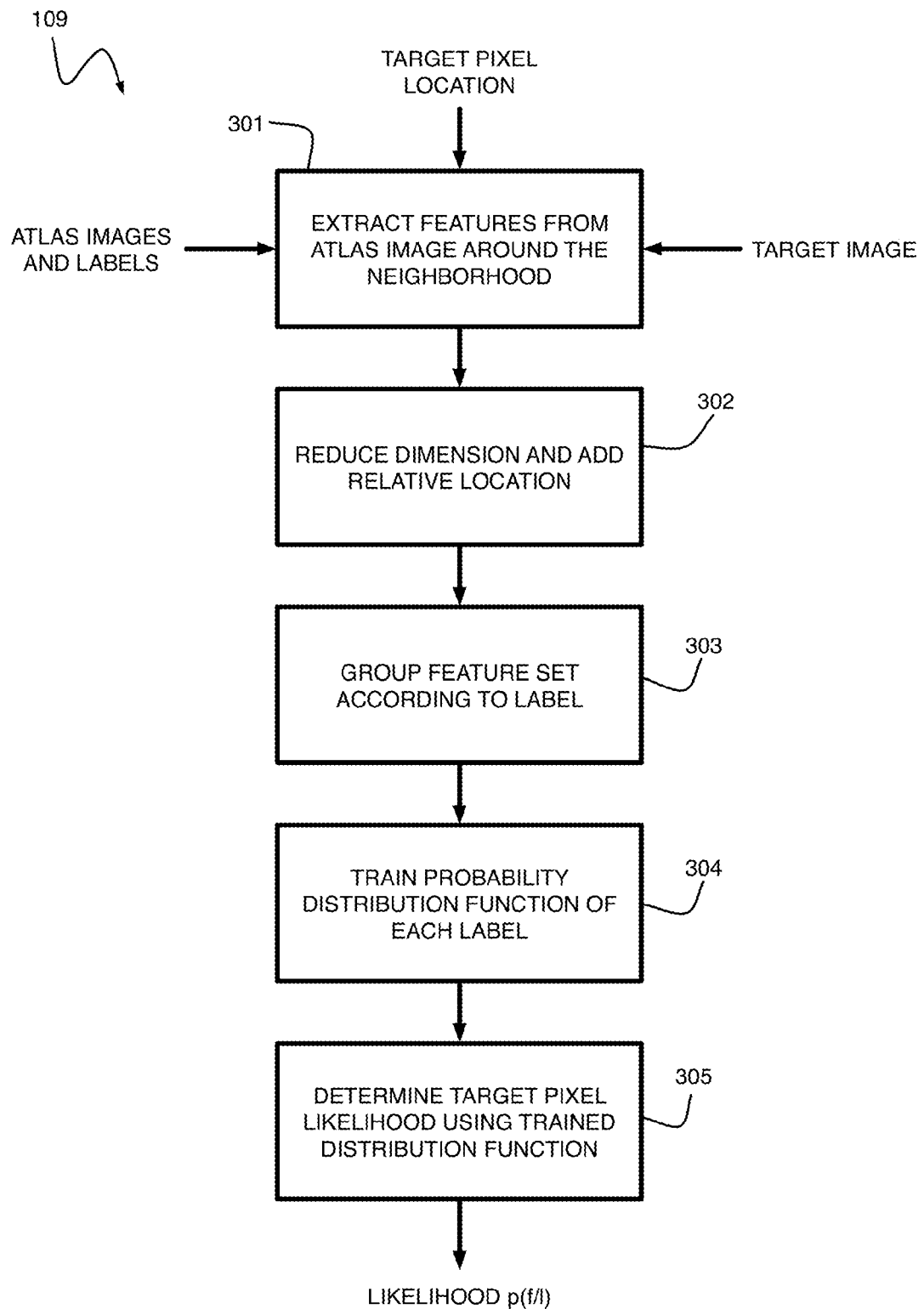
FIG. 3 is a flow diagram of a method for discriminative modeling in a label fusion method according to an exemplary embodiment of the present invention.

Referring to FIGS. 2 and 3, atlas label fusion framework 107 combines the label of the selected atlas to obtain the target label before post-processing 111. For each pixel of the target image, a discriminative model is trained 108 according to FIG. 2 and a generative model is trained 109 according to FIG. 3.

Referring to FIG. 2, according to one or more embodiments of the present invention, a set of feature vectors are determined around the neighborhood of the pixel in the corresponding atlases and the label of the pixel is assigned to each feature vector 201. According to one or more embodiments of the present invention, the feature vector can be extracted from image intensities, image gradients, wavelets, etc., from the local patch. A probabilistic classifier is trained 202 using the extracted training feature in the local neighborhood (e.g., a 2×2×2 neighborhood, a 3×3×3 neighborhood, etc.) to predict a label for the target image pixel 203. Classifiers such as random forest, support vector machine, and neural networks can be used. It should be understood that the local neighborhood can be sized according to an application and that the application is not limited to any particular sized neighborhood.

According to one or more embodiments of the present invention, to train the generative model 109 according to FIG. 3, the dimension of the feature vectors determined at 301 is reduced at 302 using a principal component analysis to filter out noise in the feature vectors. (It should be understood that features extracted at 201 and 301 can be different, but they are determined from the same local neighborhood of the target image and selected registered atlas images). The relative location of a center of an image patch is also included in the feature vector. The relative location is determined with respect to the target pixel location. In 303, a feature set is grouped into several feature subsets according to the label each subset contains and a probability distribution function is trained on each feature subset at 304 to determine target pixel likelihoods at 305.

Modeling techniques (such as Gaussian mixture model, Kernel density estimation, etc.) can be used to train the probability distribution function for each label.

The probability score from the discriminative model and the likelihood score from the generative model are combined at 110. More particularly, the feature vectors on a patch centered at a pixel of the target image are extracted as in 301 (FIG. 3). The classification scores of the feature vectors using the trained classifier from 203 (FIG. 2). This trained classifier gives the prior probability p(l) of each label for the pixel. The likelihood score of the feature for each label is determined using the probability distribution function trained at 305. This probability distribution function outputs the likelihood p(f/l) of the feature determined at the pixel for each label. A final posterior probability of the label at the pixel is determined at 110 using a Bayesian equation $p(l/f)=(p(f/l)*p(l))/C$, where C is a constant that can be determined by summing the term $p(f/l)*p(l))$ for all labels.

According to an embodiment of the present invention, in the post processing 111, over segmentation is used to remove spurious segmentation around label boundaries and outliers. Over segmentation groups pixels that are spatially closer and that share a similar appearance into a patch called super-pixel. Thus, a group of pixels inside the super-pixel share similar pixel characteristics. For each super-pixel, a histogram from the posterior probability of pixels is determined. Then all pixels inside the super-pixel are assigned to the label with a largest histogram value. The post processing 111 can further include the display of an image of a segmented object, such as a heart, left or right ventricles, portions of a brain etc.

By way of recapitulation, according to an exemplary embodiment of the present invention, a method for segmenting a target image includes receiving the target image of an anatomical structure 102, registering a plurality of atlases to the target image 101, each of the atlases including an image and a plurality of labels corresponding to portions of the image, transferring the labels of registered atlases to the target image 106, combining the labels that are transferred to the target image using a fusion of a discriminative model and a generative model 107, and outputting a segmentation of the target image isolating the anatomical structure, wherein a segmentation of the target image is displayed 111. The anatomical structure can include a left ventricle of heart and a right ventricle of heart, fibroglandular tissue or fat in breast images, a hippocampus in the brain, etc.

Throughout the present disclosure, it should be understood that the term "pixel" includes one or more pixels and voxels, whether in 2D or 3D.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a system for feedback collection and analysis. Further, a computer program product can include a tangible computer-readable recordable storage medium with code adapted to be executed to carry out one or more method steps described herein, including the provision of the system with the distinct software modules.

Figure 4:
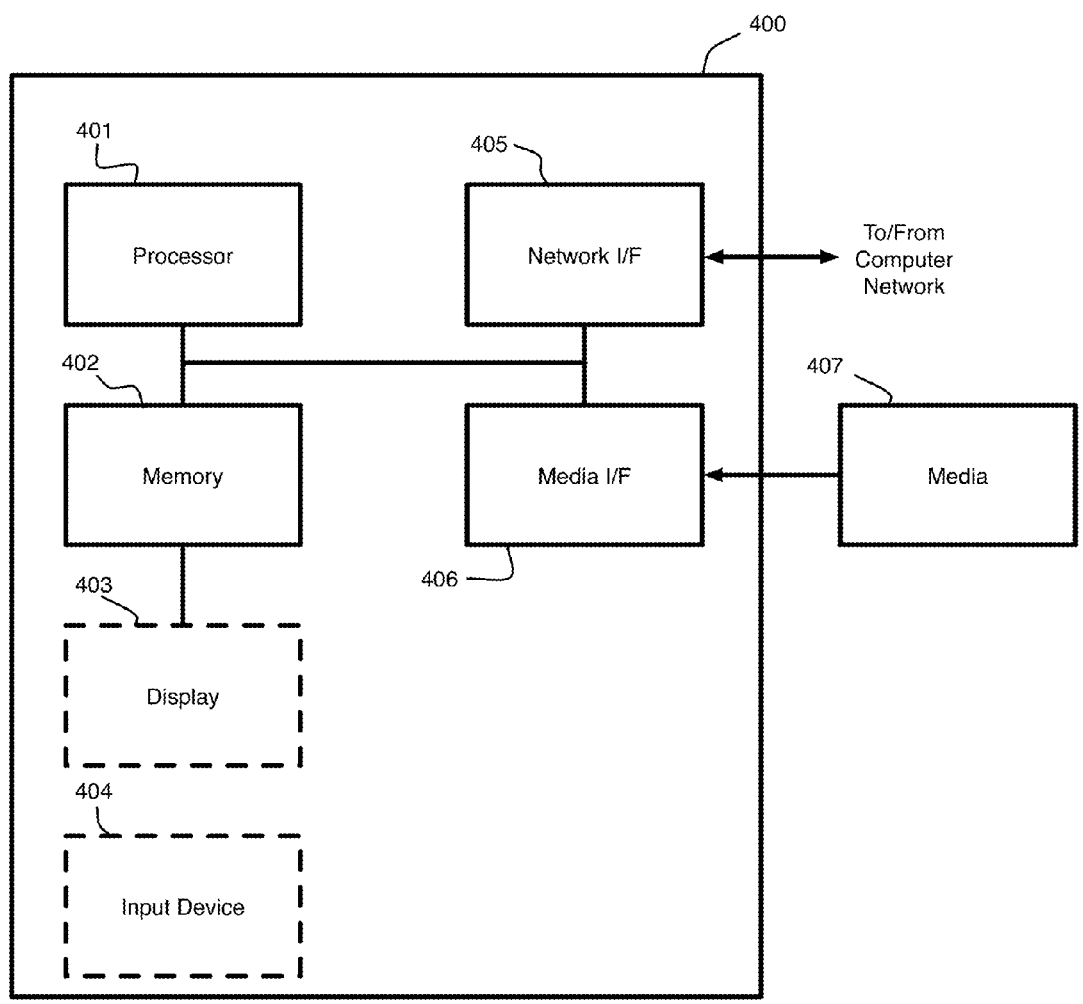
FIG. 4 is a diagram of a computer system configured for multi-atlas segmentation according to an exemplary embodiment of the present invention.

Referring to FIG. 4; FIG. 4 is a block diagram depicting an exemplary computer system 400 for multi-atlas based segmentation according to an embodiment of the present invention. The computer system shown in FIG. 4 includes a processor 401, memory 402, display 403, input device 404 (e.g., keyboard), a network interface (I/F) 405, a media IF 406, and media 407, such as a signal source, e.g., camera, Hard Drive (HD), external memory device, etc.

In different applications, some of the components shown in FIG. 4 can be omitted. The whole system shown in FIG. 4 is controlled by computer readable instructions, which are generally stored in the media 407. The software can be downloaded from a network (not shown in the figures), stored in the media 407. Alternatively, software downloaded from a network can be loaded into the memory 402 and executed by the processor 401 so as to complete the function determined by the software.

The processor 401 may be configured to perform one or more methodologies described in the present disclosure, illustrative embodiments of which are shown in the above figures and described herein. Embodiments of the present invention can be implemented as a routine that is stored in memory 402 and executed by the processor 401 to process the signal from the media 407. As such, the computer system is a general-purpose computer system that becomes a specific purpose computer system when executing routines of the present disclosure.

Although the computer system described in FIG. 4 can support methods according to the present disclosure, this system is only one example of a computer system. Those skilled of the art should understand that other computer system designs can be used to implement embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

The invention claimed is:

1. A method for segmenting a target image comprising:
   receiving the target image of an anatomical structure, wherein the target image is stored in a memory;
   registering a plurality of atlases to the target image, each of the atlases including an image and a plurality of labels corresponding to portions of the image;
   selecting a plurality of registered atlases;
   transferring the labels of selected registered atlases to the target image;
   combining the labels that are transferred to the target image using a fusion of a discriminative model and a generative model to obtain fused labels for the target image;
   processing, by a processor, the target image using the fused labels to obtain a segmentation of the target image isolating the anatomical structure; and
   outputting, to a display, the segmentation of the target image isolating the anatomical structure, wherein the segmentation of the target image is displayed.

2. The method of claim 1, further comprising generating the plurality of atlases, wherein the portions of the image correspond to the anatomical structure.

3. The method of claim 1, wherein the registration is on a pixel-to-pixel correspondence between the atlases and the target image.

4. The method of claim 1, wherein the selection of the plurality of the registered atlases uses a criteria for selection.

5. The method of claim 4, further comprising:
   determining a feature similarity between each of the registered atlases and the target image;
   determining a first ranking each of the registered atlases according to the feature similarities;
   determining a feature distance between each of the registered atlases and the target image;
   determining a second ranking each of the registered atlases according to the feature distances; and selecting the registered atlases using the first ranking and the second ranking, wherein the feature similarity and the feature distance are the criteria for selection.

6. The method of claim 1, further comprising determining the discriminative model.

7. The method of claim 6, further comprising:
extracting a feature vector of a local neighborhood around each pixel of the atlases; and
training a probabilistic classifier using the feature vectors.

8. The method of claim 1, further comprising determining the generative model.

9. The method of claim 8, further comprising:
extracting a feature vector of a local neighborhood around each pixel of the atlases;
reducing a dimension of the feature vectors;
adding a relative location to the feature vectors;
grouping the feature vectors according to the labels;
training a probability distribution function on a feature vector set of each of the labels; and
determining a target pixel likelihood using the probability distribution function.

10. The method of claim 1, wherein the combination of the labels comprises:
extracting a feature vector on a patch centered at a given pixel on the target image;
determining a classification score of the feature vector using a classifier of the discriminative model, which outputs a prior probability $p(l)$ of each label l for the given pixel;
determining a likelihood score of the feature vector for each label using a probability distribution function of the generative model, which outputs a likelihood $p(f/l)$ of the feature vector f determined at the given pixel for each of the labels; and
determining a posterior probability of a label at the given pixel using a Bayesian rule as $p(l/f)=(p(f/l)*p(l))/C$, where C is a constant determined by summing a term $p(f/l)*p(l))$ for all labels.

* * * * *